United States Patent
Kitamura et al.

(10) Patent No.: US 7,311,637 B2
(45) Date of Patent: Dec. 25, 2007

(54) AUTOMATIC TRANSMISSION CONTROL SYSTEM

(75) Inventors: Toshio Kitamura, Ageo (JP); Yuuichi Ichikawa, Ageo (JP); Akihisa Hayashi, Ageo (JP); Isao Okamoto, Ageo (JP); Osamu Isobe, Ageo (JP)

(73) Assignee: Nissan Diesel Motor Co., Ltd., Saitama (JP)

( * ) Notice: Subject to any disclaimer, the term of this patent is extended or adjusted under 35 U.S.C. 154(b) by 235 days.

(21) Appl. No.: 11/235,064

(22) Filed: Sep. 27, 2005

(65) Prior Publication Data

US 2006/0030456 A1    Feb. 9, 2006

Related U.S. Application Data

(63) Continuation of application No. PCT/JP2004/004252, filed on Mar. 26, 2004.

(30) Foreign Application Priority Data

Mar. 28, 2003  (JP) ............................. 2003-090824

(51) Int. Cl.
*F16H 59/30* (2006.01)
(52) U.S. Cl. .................................... 477/121
(58) Field of Classification Search ............ 477/121, 477/138; 74/513
See application file for complete search history.

(56) References Cited

U.S. PATENT DOCUMENTS 5,529,296 A * 6/1996 Kato et al. ............. 74/513

FOREIGN PATENT DOCUMENTS

| JP | 64-39955 | 9/1987 |
| JP | S63-126650 | 8/1988 |
| JP | 1-130832 | 9/1989 |
| JP | 2001-154750 | 6/2001 |
| JP | 2001-227638 | 8/2001 |
| JP | 2002-48232 | 2/2002 |

OTHER PUBLICATIONS

English abstract of Nissan Diesel Technological Report No. 60, publication date Mar. 14, 1998. Pertinent information noted in red.

* cited by examiner

*Primary Examiner*—Dirk Wright
(74) *Attorney, Agent, or Firm*—Baker & Hostetler LLP

(57) ABSTRACT

In an automatic transmission control system, an operating amount of a throttle due to a driver's depression of an accelerator pedal is detected, and the rotating number of an engine suitable for the detected throttle operating amount is detected. The automatic transmission control system includes a shift map defined by the throttle operating amount and the engine rotating number. The actuation of upshift or downshift of a transmission is automatically controlled based on the shift map. The driver can be informed of a point where a shift map is switched by a depression operation of the accelerator pedal so that generation of unnecessary downshift and delay of upshift are prevented to allow a vehicle to be efficiently driven.

5 Claims, 6 Drawing Sheets (a)

(b)

(a)

(b)

(c)

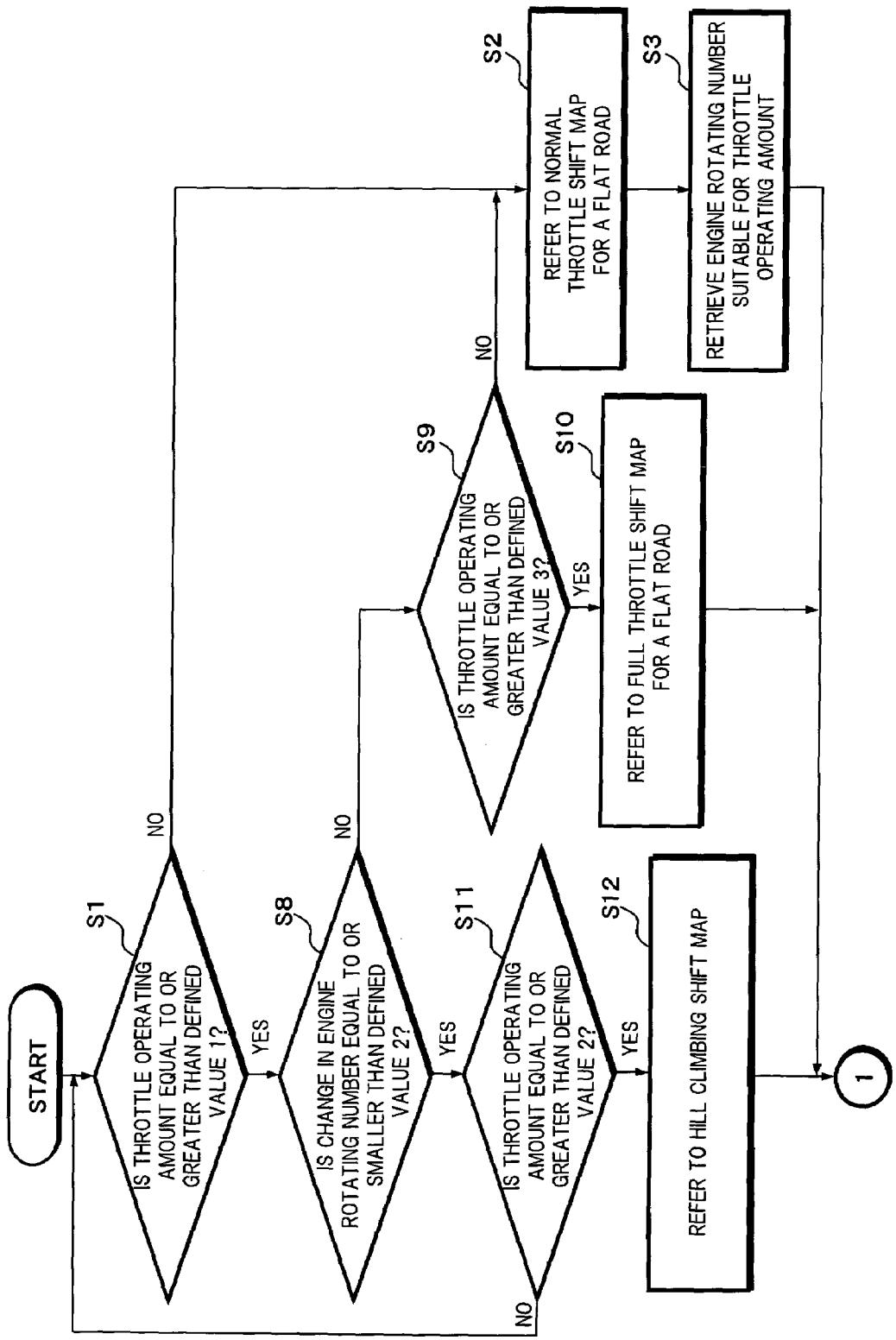

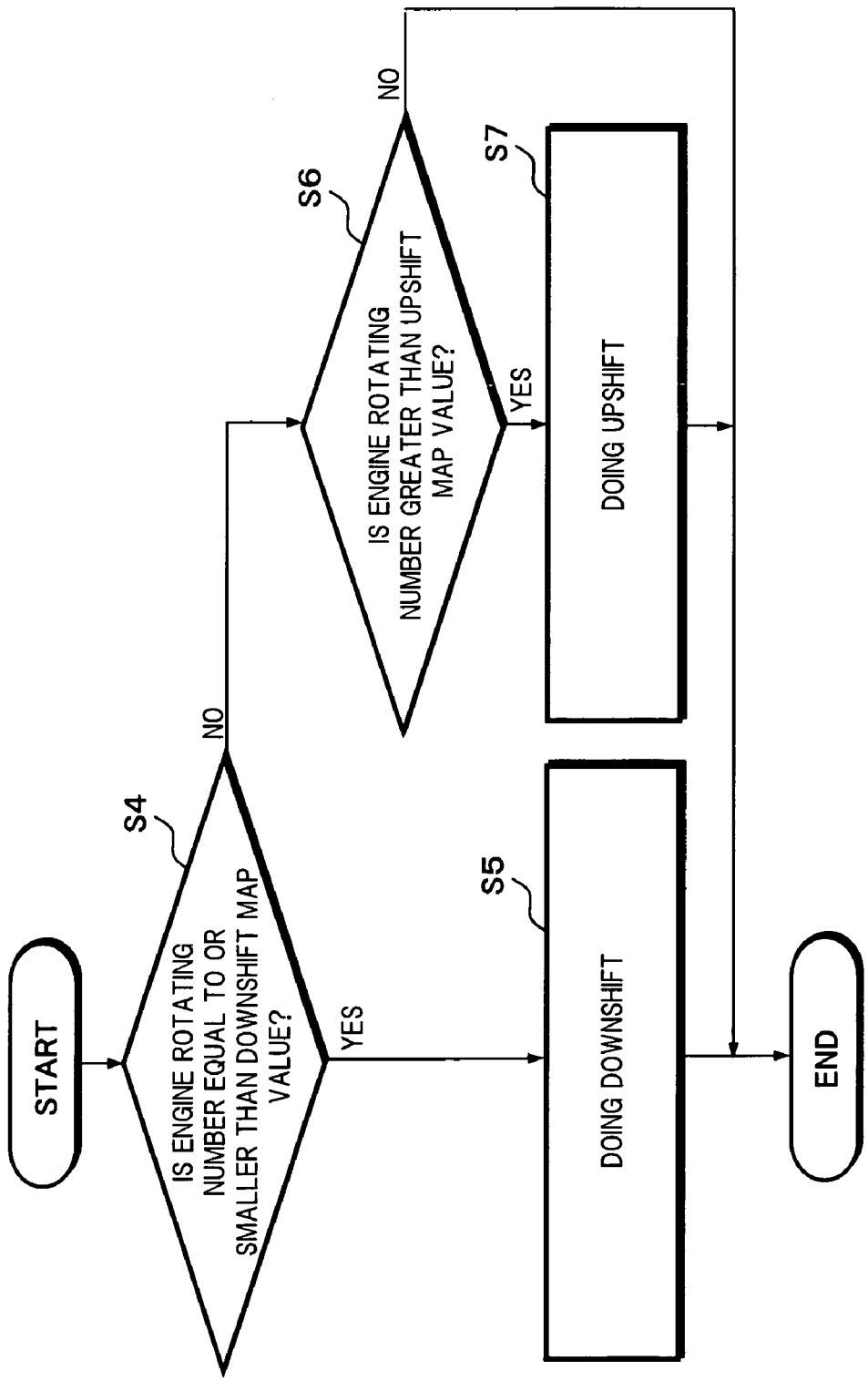

AUTOMATIC TRANSMISSION CONTROL SYSTEM

CROSS REFERENCE TO RELATED APPLICATIONS

This application is a continuation of PCT/JP2004/004252, filed on Mar. 26, 2004.

FIELD OF THE INVENTION

The present invention relates to an automatic transmission control system which automatically controls a transmission in accordance with a running state of a vehicle detected during running of the vehicle. More particularly, the invention relates to an automatic transmission control system in which a driver can realize a point where a shift map is switched by an operation to depress an accelerator pedal so that occurrence of unnecessary downshift or delay of upshift is prevented so as to permit the driver to efficiently drive the vehicle.

BACKGROUND OF THE INVENTION

A conventional automatic transmission control system is provided therein with a shift map defined by a throttle operating amount and an engine rotating number (or a vehicle speed) for each of gears of a transmission, and a shift point is determined by this shift map. According to the shift map, the rotating number of an engine (or vehicle speed) is set such that when the throttle operating amount by the driver is large, downshift is likely to occur but upshift is not likely to occur, and when the throttle operating amount is small, downshift is not likely to occur but upshift is likely to occur.

Further, in the conventional art, plural sorts of such shift maps are preliminarily prepared, and the optimal one of them is selected in accordance with the running state of the vehicle. For example, in the shift map suitable for upshift or downshift for hill climbing, the engine rotating number is set higher, and therefore the downshift timing is quickened so that a driving force for driving uphill is set greater. The running state of the above-described case is determined by assumption from the throttle operating amount and the engine rotating number for the gear position taken. For example, when an increase in the engine rotating number is small with respect to the predetermined throttle operating amount, it is assumed that the vehicle is in hill climbing, and a shift map which is set for the hill climbing is selected. Such a technique is described in "Nissan Diesel Technical Report No.60" by Nissan Diesel Motor Co., Ltd. on Mar. 14, 1998, pages 16 to 21.

In such a conventional automatic transmission control system, however, when the increase in the engine rotating number is smaller than the predetermined throttle operating amount, it is determined that the vehicle is hill climbing, and the shift map which is set for the hill climbing is selected. Therefore, since it is determined that the vehicle is in hill climbing and the shift map for the hill climbing is selected after the vehicle actually started hill climbing, the downshift timing is delayed, and the driving force of the engine becomes occasionally insufficient. Further, it is difficult to foresee the length of the uphill road and its gradient change, and downshift operation is carried out in some cases although the vehicle can sufficiently run uphill with the currently selected gear.

In the condition of a heavy commercial vehicle such as a truck and a bus, since the vehicle weight is heavy and margin of the engine driving force is small, there is often a case where a driver constantly depresses the accelerator pedal to a full amount during the driving. Hence, unnecessary downshift automatically occurs even during running on a flat road, and the upshift is delayed in some cases. Thus, the vehicle running at a high engine rotation lasts for a long while despite the driver's intention and as a result, the driver is unable to drive the vehicle economically.

Therefore, it is an object of the present invention to provide an automatic transmission control system in which the above-described problems can be overcome, and a driver can realize a point where a shift map is switched by an operation to depress an accelerator pedal, to thereby prevent occurrence of any unnecessary downshift and delay of upshift while enabling it to efficiently drive a vehicle.

SUMMARY OF THE INVENTION

To achieve the above object, the present invention provides an automatic transmission control system provided with a throttle operating amount detecting means for detecting an operating amount of a throttle, which is operated by depression of an accelerator pedal by a driver, an engine rotating number detecting means for detecting a rotating number of an engine in accordance with the throttle operating amount, and an automatic transmission means which includes a shift map defined by the said throttle operating amount and the engine rotating number and which automatically controls actuation of upshift or downshift of a transmission based on the shift map, wherein provision is further made of a depressing force changing means that gives a changing point of a depressing force during a stroke of depression of the accelerator pedal, and of a changing point of the engine rotating number on the said shift map which is located at a boundary where the throttle operating amount corresponding to the depressing force changing point of the accelerator pedal occurs, so that actuation of the upshift or downshift based on the shift map is controlled by the depression of the accelerator pedal which is beyond the depressing force changing point.

With this constitution, the changing point of the depressing force is given in the midway of the depression stroke of the accelerator pedal by the depressing force changing means, and the actuation of the upshift or downshift based on the shift map having the changing point of the engine rotating number located at the boundary where the throttle operating amount corresponding to the depressing force changing point of the accelerator pedal occurs, is controlled by the depression of the accelerator pedal beyond the depressing force changing point. Hence, the driver can be informed of the point at which the shift map is switched by the depression operation of the accelerator pedal, and it is possible to prevent the unnecessary downshift or the delay of the upshift, to thereby drive the vehicle efficiently and economically.

Further, the said depressing force changing means includes a reaction force generating mechanism which generates a reaction force against the depression of the accelerator pedal. Hence, the changing point of the depressing force may be given in the midway of the depression stroke of the accelerator pedal, so that it is possible for the driver to carry out the downshift intentionally and to adjust the upshift timing at the time of acceleration by realizing the changing point of the depressing force.

The reaction force generating mechanism may be comprised of a damper which gives a resisting force against the depression of the accelerator pedal. Thus, the reaction force generating mechanism can be achieved by a simple structure.

Further, the automatic transmission means includes a plural sorts of the shift maps defined by a different throttle operating amount and the engine rotating number in accordance with a running state of the vehicle, and one of the shift maps is selected and switched in accordance with a depressing degree which is beyond the said depressing force changing point of the accelerator pedal. Hence, one of the shift maps can be selected depending upon the depressing degree of the accelerator pedal which is beyond the depressing force changing point, and it is possible to drive the vehicle efficiently and thus economically.

The plural sorts of the shift maps are a flat road normal running shift map for upshift or downshift, a flat road acceleration shift map in which the engine rotating number for either upshift or downshift is set higher than that of the flat road normal running shift map, and a hill climbing shift map in which the engine rotating number for either upshift or downshift is set higher than that of the flat road acceleration shift map. Therefore, it is possible to select the suitable one of the shift maps in accordance with the running state of the vehicle, and to drive the vehicle efficiently and thus economically.

SUMMARY OF THE INVENTION

FIG. 6 is a flowchart used for explaining the operation of the automatic transmission control system according to the present invention.

FIG. 7 is a flowchart used for explaining the operation of the automatic transmission control system.

DETAILED DESCRIPTION

An embodiment of the present invention will be described in detail based on the accompanying drawings.

Figure 1:
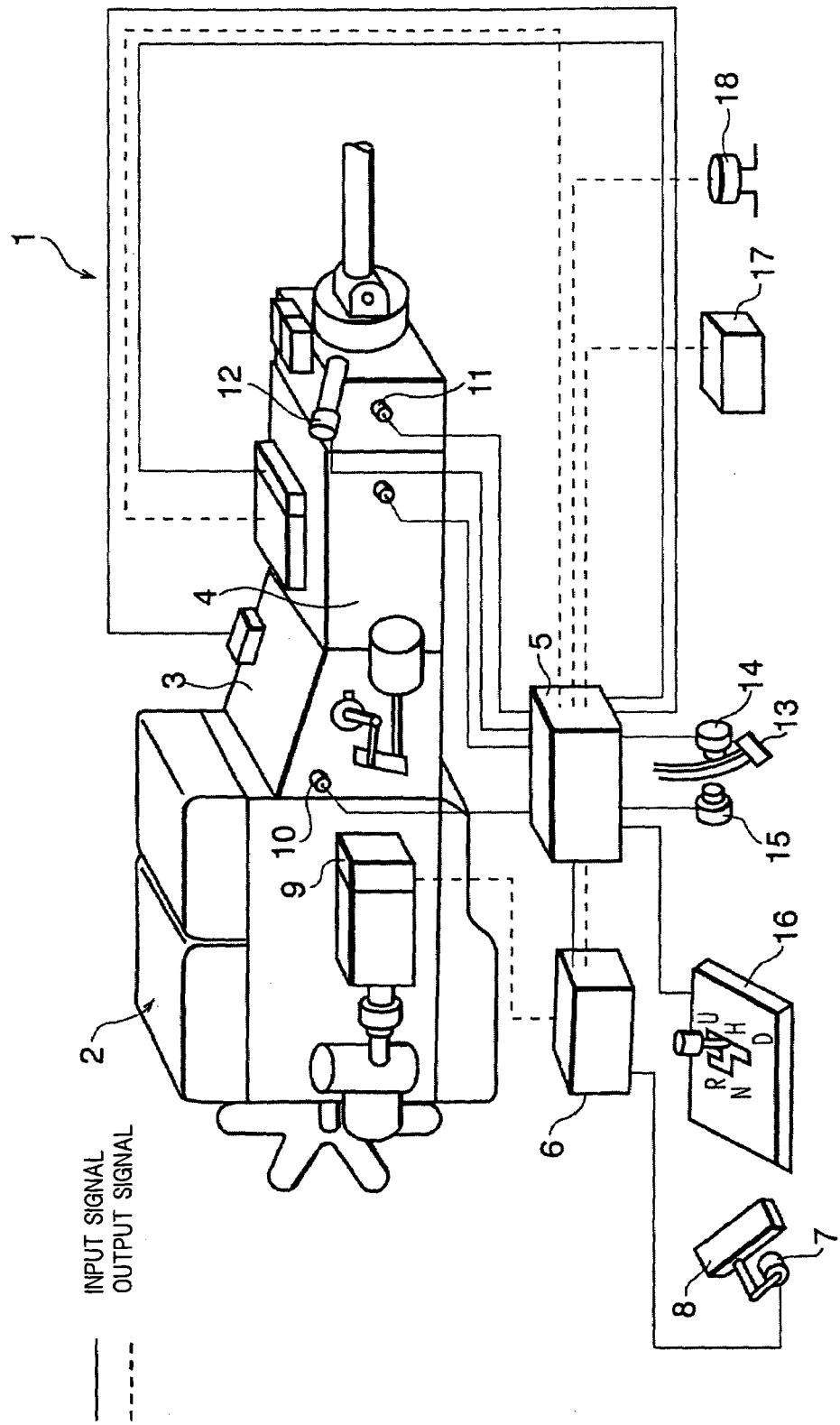
FIG. 1 is a perspective explanatory view illustrating an automatic transmission control system according to an embodiment of the present invention, as the entire constitution including an engine.

FIG. 1 is a perspective explanatory view showing an automatic transmission control system according to the embodiment of the present invention, as the entire constitution including an engine. This automatic transmission control system 1 automatically controls a transmission in accordance with a running state detected during running of a vehicle such as a truck and a bus. In FIG. 1, a transmission 4 is mounted on the engine 2 via a clutch 3. A transmission control unit 5 is connected to the transmission 4 through an electric wiring. An engine control unit 6 is connected to the said engine 2 through an electric wiring.

A stroke sensor 7 of an accelerator pedal 8 is connected to the above-mentioned engine control unit 6 through an electric wiring. The stroke sensor 7 is a throttle operating amount detecting means for detecting an operating amount of the throttle by the depression of the accelerator pedal 8 by the driver. In practice, the stroke sensor 7 detects an amount of opening of the throttle, which is opened and closed by the operation of the accelerator pedal 8 by the driver, and sends a signal indicating the detected throttle opening amount to the engine control unit 6.

The engine control unit 6 is an engine controlling means which receives the signal of the throttle operating amount detected by the above-mentioned stroke sensor 7 as an input signal, and controls the driving operation of the engine 2. An output signal from the engine control unit 6 is transmitted to a fuel injection apparatus 9 mounted on the engine 2. The signal of the throttle operating amount detected by the above-mentioned stroke sensor 7 is also transmitted to the transmission control unit 5.

An engine rotating number sensor 10 is connected to the transmission control unit 5 through an electric wiring. The engine rotating number sensor 10 is engine rotating number detecting means, which detects the rotating number of the engine 2 according to the throttle operating amount detected by the above-mentioned stroke sensor 7. The engine rotating number sensor 10 is mounted on the clutch 3, for example, and a detection signal of the engine rotating number is transmitted to the transmission control unit 5.

The transmission control unit 5 is an automatic transmitting means, which includes shift maps defined by the above-mentioned throttle operating amount and the engine rotating number. The transmission control unit 5 controls the actuation of upshift and downshift of the transmission 4 based on the shift maps. More specifically, the transmission control unit 5 executes the above-mentioned controlling operation when receiving a signal from the engine rotating number sensor 10, signals from a gear rotating speed sensor 11 and a vehicle speed sensor 12, which are mounted on the transmission 4, and signals from a clutch-engaging switch 14 and a clutch-disengaging switch 15, which are mounted on a clutch pedal 13. The transmission control unit 5 is further connected to a shift tower 16 having a shift lever for shifting gears of the transmission 4.

A signal indicating the contents of the controlling operation executed by the transmission control unit 5 is transmitted to the above-described engine control unit 6 from the transmission control unit 5. The above-mentioned signal indicating the control contents is also transmitted to a display monitor 17 and a buzzer 18 so that a driver is informed of the control contents.

Figure 2:
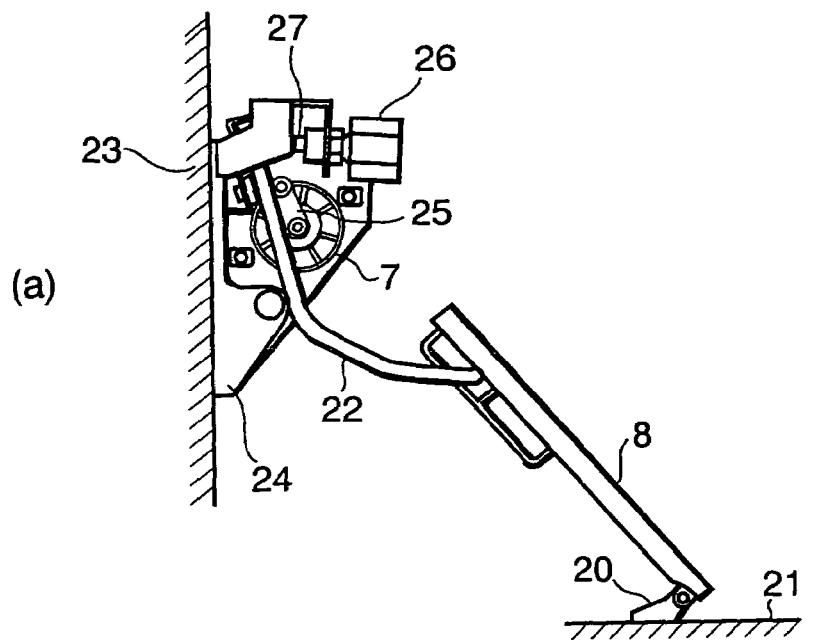
FIG. 2 is a side explanatory view illustrating two somewhat different constitutions of an operating mechanism of an accelerator pedal in the automatic transmission control system.
Figure 2:
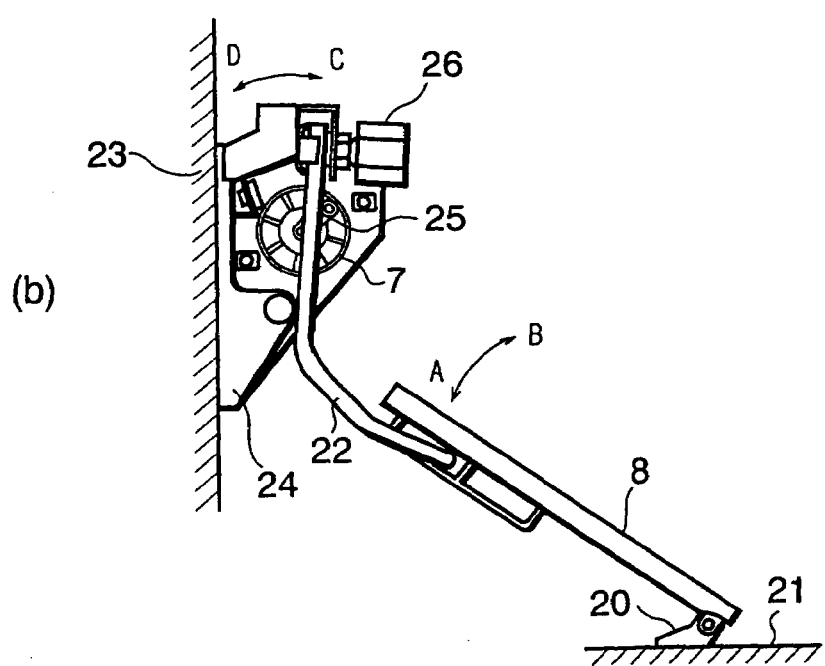

Here, the operating mechanism of the accelerator pedal 8 is configured as shown in FIG. 2. That is, a lower end of the accelerator pedal 8 is turnably connected to a floor surface 21 via a fitting 20, and an upper end of the accelerator pedal 8 is engaged with an upper end of the operation lever 22 which has a swinging center on the central portion and which is supported by a bracket 24 mounted on an inner wall 23 of a driver's cabin. Hence, as shown in FIG. 2(b), the accelerator pedal 8 can turn about its lower end as shown by arrows A and B, and the other end of the operation lever 22 can turn as shown by arrows C and D. At that time, the other end of the operation lever 22 abuts against a turning link 25 of the stroke sensor 7, and the operating amount of the throttle caused by the depression of the accelerator pedal 8 is detected by the turning amount of the above-mentioned turning link 25. The stroke sensor 7 has a coil spring therein, for example, so that the other end of the operation lever 22 is biased in the direction of the arrow D by the spring, thereby always biasing the upper end of the accelerator pedal 8 in the direction of the arrow B.

In the present invention, as shown in FIG. 2, a damper 26 is provided in the vicinity of a terminal portion of a region where the other end of the above-mentioned operation lever 22 turns. The damper 26 is a depressing force changing means which gives a changing point of a depressing force in the depressing stroke of the accelerator pedal 8 in the direction of the arrow A. The damper 26 generates a reaction force against the depression of the accelerator pedal 8. The damper 26 is provided therein with a switch and a resilient member such as a spring or a rubber element for giving a resistance force against the depression of the accelerator pedal 8. As shown in FIG. 2(b), the other end of the operation lever 22 which swings in the direction of the arrow C comes in contact with a contacting element 27, which projects from the damper 26 shown in FIG. 2(a), and the changing point of the depressing force is given in the midway of depressing stroke of the accelerator pedal 8 in the direction of the arrow A.

A manner of giving the changing point of the depressing force by the damper 26 with respect to the depressing operation of the accelerator pedal 8 will be explained with reference to FIGS. 3. First, FIG. 3(a) shows a state just before when a full throttle position is achieved due to depression of the accelerator pedal 8 from when the driver does not depress the accelerator pedal 8 at all, during a normal running state of a vehicle. At that time, the other end of the operation lever 22 turns as shown by the arrows C and D, but the other end does not come in contact with the contacting element 27 of the damper 26.

Next, FIG. 3(b) shows a state of the full throttle position or that coming adjacent to the full throttle position during the normal running state of the vehicle. At that time, the driver depresses the accelerator pedal 8 in the direction of the arrow A, and thus the other end of the operation lever 22 turns as shown by the arrow C, to result in coming in contact with the contacting element 27 of the damper 26. Hence, the above-mentioned damper 26 gives a resistance force against the depression of the accelerator pedal 8 of the driver, and the changing point of the depressing force can be given in the midway of the depressing stroke of the accelerator pedal 8. At this instant, the internally incorporated switch detects that the other end of the operation lever 22 abuts against the contacting element 27 of the damper 26, and detects that the depression of the accelerator pedal 8 reaches the changing point of the depressing force. The engine can bring out 100% of an output in the curse of depression of the accelerator pedal 8 before reaching the depressing force changing point.

Next, FIG. 3(c) shows a further state in which the driver recognizes this fact of reaching the changing point and depresses the accelerator pedal beyond the above-mentioned depressing force changing point, after the depressing force reaches the changing point. At that time, the driver needs to strongly depress the accelerator pedal 8 in the direction of the arrow A by its own intention against the resistance force of the damper 26. Here, a stopper 28 is provided for the accelerator pedal 8, which is arranged at a position defining the final stage of the depression of the accelerator pedal 8.

It should be understood that there is a predetermined amount of margin for depression (i.e., about 10% of full stroke) from a position where the depression reaches the depressing force changing point shown in FIG. 3(b) to a position of the stopper 28. If the driver depresses the accelerator pedal 8 beyond the depressing force changing point, the driver can intentionally actuate the downshift based on a shift map as described below.

Figure 3:
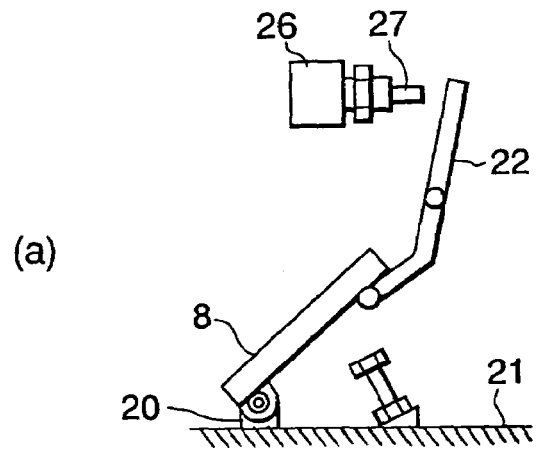
FIG. 3 is an explanatory view illustrating application of a changing point of a depressing force with respect to diverse depressing operations of the accelerator pedal having the above-described constitution.
Figure 3:
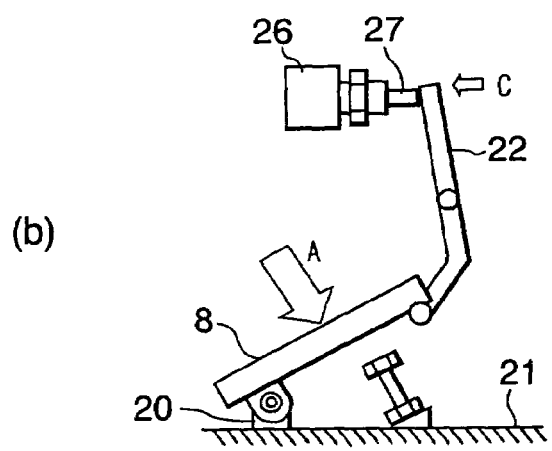
Figure 3:
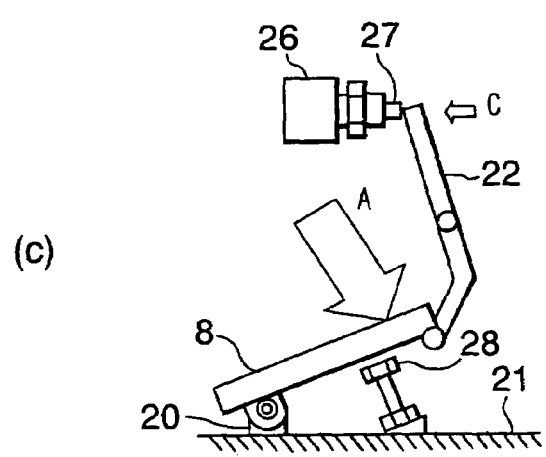
Figure 4:
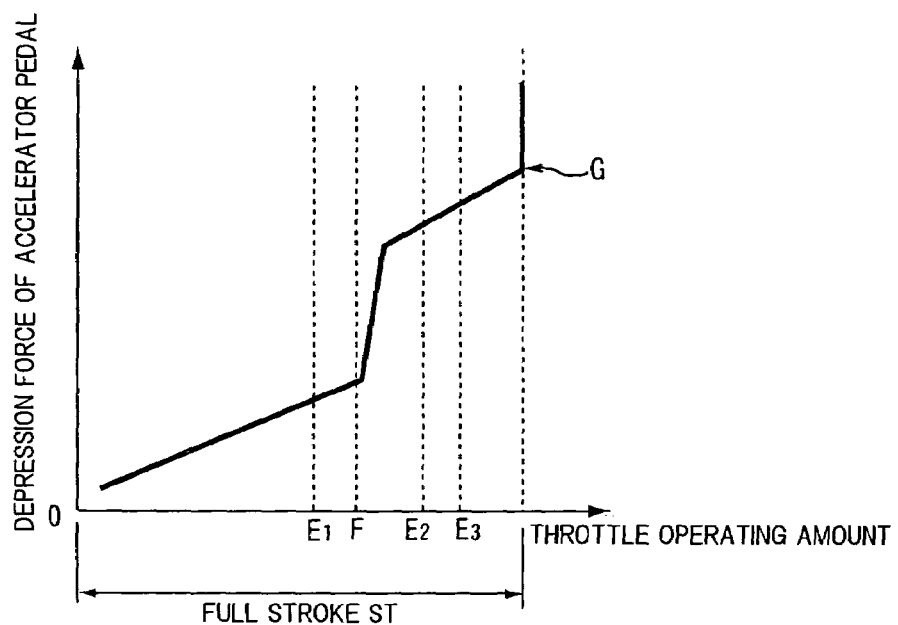
FIG. 4 is a graphical view illustrating a relationship between the throttle operating amount and the depressing force of the accelerator pedal when the changing point of the depressing force is given in the midway of a depressing stroke of the accelerator pedal as shown in FIG. 3.

FIG. 4 is a graphical view indicating a relation between the throttle operating amount and the depressing force of the accelerator pedal 8, when the changing point of the depressing force is given in the midway of the depressing stroke of the accelerator pedal 8 as shown in FIG. 3. In FIG. 4, the abscissa indicates the throttle operating amount, and the ordinate indicates the depressing force of the accelerator pedal 8. The throttle operating amount has a full stroke ST in a range from a state where the accelerator pedal 8 is not depressed to a stopper point G provided by the stopper 28 shown in FIG. 3(c).

In FIG. 4, while the accelerator pedal 8 is being depressed from a stroke "0" state as shown in FIG. 3(a), the depressing force is gradually increased, the state of the operating amount of the throttle in which the other end of the operation lever 22 is in contact with the contacting element 27 of the damper 26 as shown by the arrow C is a depressing force changing point F as shown in FIG. 3(b). At that time, as apparent from FIG. 4, the depressing force of the accelerator pedal 8 is abruptly increased, and the driver is informed and can comprehend that the depressing force reaches the depressing force changing point F. Thereafter, the depressing force of the accelerator pedal 8 is increased with drawing a predetermined curve, and when the accelerator pedal 8 abuts against the stopper 28 as shown in FIG. 3(c), the depressing force reaches the stopper point G and stops. Here, the depressing force changing point F is set to about 90% of the full stroke ST, for example.

In FIG. 4, reference symbol E1 represents a defined value 1 of the throttle operating amount provided just before the above-mentioned depressing force changing point F, reference symbol E2 represents a defined value 2 (e.g., about 95% of the full stroke ST) of the above-mentioned throttle operating amount provided at a point greater than the depressing force changing point F by a predetermined amount, and reference symbol E3 represents a defined value 3 (e.g., about 98% of the full stroke ST) of the throttle operating amount provided at a point greater than the above-mentioned defined value 2 by a predetermined amount.

Figure 5:
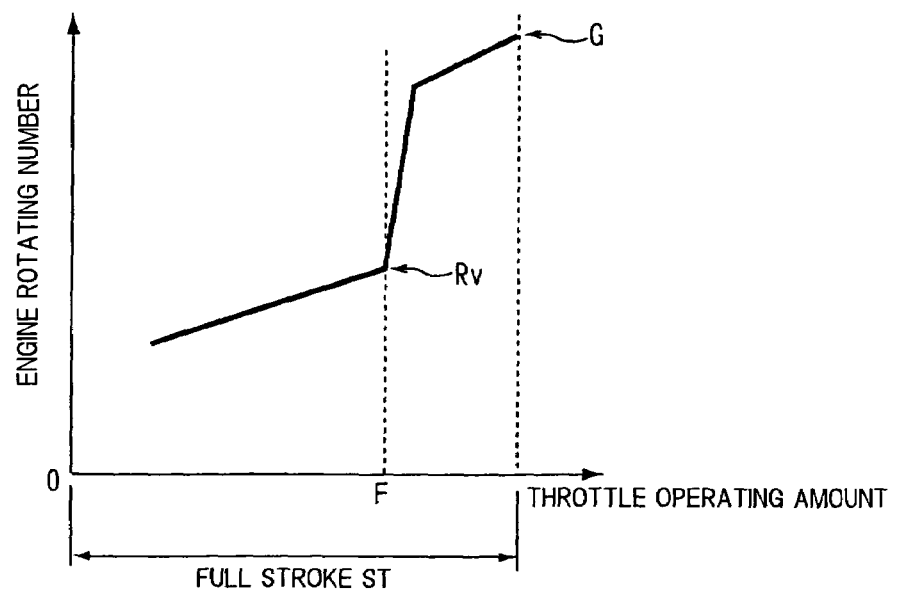
FIG. 5 is a graphical view illustrating one example (upshift map for normal throttle on flat road) of the shift map having the changing point of the engine rotating number in which a throttle operating amount corresponding to the depressing force changing point of the accelerator pedal is a boundary.

In the present invention, the shift map of the above-mentioned transmission control unit 5 is provided with the changing point of the engine rotating number (or vehicle speed: simply "engine rotating number", hereinafter) in which an throttle operating amount corresponding to the depressing force changing point F of the accelerator pedal 8 is defined as a boundary. If the accelerator pedal 8 is depressed beyond the depressing force changing point F, the actuation of upshift or downshift based on the shift map is controlled. Here, FIG. 5 is a graphical view indicating an upshift map for the normal throttle for a flat road, as one example of the shift map provided with the changing point of the engine rotating number in which the throttle operating amount corresponding to the depressing force changing point F of the accelerator pedal 8 is defined as the boundary. In FIG. 5, the abscissa indicates the throttle operating amount, and the ordinate indicates the engine rotating number (or vehicle speed). A changing point Rv of the rotating number is set at an engine rotating number that corresponds to the depressing force changing point F of the accelerator pedal 8.

In FIG. 5, the engine rotating number is gradually increased while the accelerator pedal 8 is depressed from the stroke "0" as shown in FIG. 3(*a*). And then, the rotating number becomes the changing point Rv when the other end of the operation lever 22 comes in contact with the contacting element 27 of the damper 26 as shown with the arrow C, in other words, when the throttle operating amount reaches the depressing force changing point F, the engine rotating number is abruptly increased. Then, the engine rotating number is increased such as to draw a predetermined curve, and when the accelerator pedal 8 abuts against the stopper 28 as shown in FIG. 3(*c*), the rotating number reaches the stopper point G. If the rotating number is increased beyond the changing point Rv of the engine rotating number, the upshift by the shift map is not actuated until the engine rotating number is increased. That is, if the accelerator pedal is depressed beyond the depressing force changing point F, the upshift timing at the time of acceleration is delayed.

The above-described shift map is a map for two dimensionally interpolating the engine rotating number in accordance with the throttle operating amount. This shift map has identical kinds of maps for the respective gear stages. FIG. 5 shows an upshift map for a normal throttle operation on the flat road. Although a downshift map for the normal throttle operation on the flat road exhibits an engine rotating number value different from that of the upshift map, the downshift map has the identical curve as the upshift map. The upshift map and the downshift map constitute the shift map for the normal throttle operation on the flat road.

In the present invention, the above-mentioned transmission control unit 5 includes a plurality of shift maps defined by different throttle operating amounts and the rotating number of the engine in accordance with the running state of the vehicle, and one of the plurality of shift maps is selected and switched depending upon the depression degree beyond the depressing force changing point F of the accelerator pedal 8. The plurality of shift maps has the shift map of the upshift or downshift for running on the normal flat road shown in FIG. 5, a flat road acceleration shift map in which the engine rotating number of the upshift or the downshift is set higher than that of the flat road normal running shift map, and a hill climbing shift map in which the engine rotating number of the upshift or downshift is set higher than that of the flat road acceleration shift map.

In this case, if the flat road acceleration shift map is selected, the upshift or the downshift is carried out at slightly faster timing than that of the flat road normal running shift map. If the hill climbing shift map is selected, the upshift or downshift is carried out at faster timing than that of the flat road acceleration shift map.

Next, the operation of the automatic transmission control system having the above configuration will be explained with reference to the flowcharts shown in FIGS. 6 and 7.

Assuming that a driver is driving a vehicle on a road while operating the accelerator pedal 8 as shown in FIGS. 3, the transmission control unit 5 determines whether the throttle operating amount is equal to or greater than the defined value 1 ($E_1$) (step S1 in FIG. 6).

Here, if the throttle operating amount is less than the defined value 1, the procedure proceeds along "NO" in step S1. This means that the vehicle is normally running on a flat road. In step S2, the normal throttle shift map for the flat road (including the upshift map and the downshift map) shown in FIG. 5 is selected and is referred to. Then, the engine rotating number which is suitable for the throttle operating amount at that time is retrieved on the shift map (step S3).

Then, the procedure proceeds to step S4 shown in FIG. 7 via a connector designated at 1, and it is determined whether the retrieved engine rotating number is equal to or less than the downshift map value in the flat road normal throttle shift map. If the engine rotating number is equal to or less than the downshift map value, the procedure proceeds along "YES" in step S4 and proceeds to step S5. In this case, since the engine rotating number stays low against the throttle operating amount, controlling operation is performed to actuate the downshift (step S5).

To the contrary, if the engine rotating number retrieved in step S4 is higher than the downshift map value, the procedure proceeds along "NO", i.e., step S6. In step S6, it is determined whether the engine rotating number exceeds the upshift map value in the normal throttle shift map for the flat road. If the engine rotating number exceeds the upshift map value in such flat road normal throttle shift map, the procedure proceeds along "YES", i.e., step S7. In this case, since the engine rotating number is high against the throttle operating amount, control is performed to actuate the upshift (step S7).

If it is determined that the engine rotating number does not exceed the upshift map value in step S6, the procedure proceeds along "NO" and the procedure is completed. In this case, the throttle operating amount and the engine rotating number are balanced and thus, the shift control is not carried out, and the vehicle is allowed to continue the running.

Next, if the throttle operating amount is equal to or greater than the defined value 1 ($E_1$) shown in FIG. 4, the procedure proceeds to "YES", i.e., step S8. Then, it is determined whether a change in the engine rotating number is equal to or smaller than a defined value. If the change in the engine rotating number is greater than the defined value, the procedure proceeds along "NO" from step S8. In this case, the throttle operating amount is large causing an increase in the engine rotating number, and the vehicle is being accelerated during the running on a flat road. Then, it is determined in step S9 whether the throttle operating amount is equal to or greater than the defined value 3 ($E_3$) shown in FIG. 4.

If the throttle operating amount is smaller than the defined value 3 in step S9, the procedure proceeds along "NO" and to step S2. Thereafter, the afore-described operations of steps S2 through S7 are carried out.

If the throttle operating amount is equal to or greater than the defined value 3 in step S9, the procedure proceeds along "YES". This case means that the accelerator pedal 8 is depressed beyond the depressing force changing point F when the vehicle is running at an accelerated speed on a flat road. Thus, the flat road full throttle shift map (including the upshift map and the downshift map) having a curve similar to that shown in FIG. 5 is selected and referred to in step S10.

Then, the procedure proceeds to step S4 shown in FIG. 7 via the connector indicated at 1 in FIG. 6, and it is determined whether the engine rotating number is equal to or smaller than the downshift map value in the flat road full throttle shift map. Thereafter, the operations in steps S4 through S7 are carried out. In this case, it is determined in step S6 whether the engine rotating number exceeds the upshift map value in the full throttle shift map for the flat road. Hence, during the acceleration of the vehicle on a flat road, determination as to the equilibrium between the throttle operating amount and the engine rotating number is executed, and when the engine rotating number is small against the throttle operating amount, control is performed to actuate the downshift (step S5), and when the engine rotating number is high against the throttle operating amount, control is performed to actuate the upshift (step S7).

Next, if it is determined that a change in the engine rotating number is equal to or smaller than the defined value in step S8 in FIG. 6, the procedure proceeds to "YES". This case means that the engine rotating number is not increased despite a large throttle operating amount, and the vehicle runs on an uphill road. In step S11, it is determined whether the throttle operating amount is equal to or greater than the defined value 2 ($E_2$) shown in FIG. 4.

When the throttle operating amount is smaller than the defined value 2, the throttle operating amount does not exceed the depressing force changing point F during the running on the uphill road, and the procedure proceeds from step S11 along "NO", and returned to step S1. Then, the procedure circulates through the steps S1, S8, and S11, and the system monitors whether the accelerator pedal 8 is operated beyond the depressing force changing point F.

If the driver operates the accelerator pedal 8 beyond the depressing force changing point F, it is determined that the throttle operating amount is equal to or greater than the defined value 2 in step S11, and the procedure proceeds along "YES". This case means that the driver tries to intentionally downshift on the uphill running and depresses the accelerator pedal 8 beyond the depressing force changing point F. Then, in step S12, the hill climbing shift map (including the upshift map and the downshift map) having a curve similar to that shown in FIG. 5 is selected and referred to.

Then, the procedure proceeds to step S4 shown in FIG. 7 via the connector indicated at 1 in FIG. 6, and it is determined whether the engine rotating number is equal to or smaller than the downshift map value in the hill climbing shift map. Thereafter, the above-described operations of steps S4 through S7 are carried out. In step S6, it is determined whether the engine rotating number exceeds the upshift map value in the hill climbing shift map. Hence, during the uphill running of the vehicle, determination as to the equilibrium between the throttle operating amount and the engine rotating number is executed, and when the engine rotating number is small against the throttle operating amount, control is performed to actuate the downshift (step S5), and when the engine rotating number is high against the throttle operating amount, control is performed to actuate the upshift (step S7).

In this manner, it is possible to select one of the flat road normal throttle shift map, the flat road full throttle shift map and the hill climbing shift map, which are defined by the different throttle operating amount and the engine rotating number in accordance with the running state of a vehicle by the control of the transmission control unit 5 depending upon the depression degree of the accelerator pedal 8 beyond the depressing force changing point F, and the actuation of the downshift can automatically be controlled.

In FIG. 4, the defined value 2 ($E_2$) of the throttle operating amount may be either equal to or greater than the defined value 3 ($E_3$).

The invention claimed is:

1. An automatic transmission control system comprising:
a throttle operating amount detecting means for detecting an operating amount of a throttle due to a depression of an accelerator pedal by a driver;
an engine rotating number detection means for detecting a rotating number of an engine in accordance with the operating amount of the throttle; and
an automatic transmission means having therein a shift map defined by the operating amount of the throttle and the engine rotating number, for automatically controlling an actuation of upshift or downshift of a transmission based on the shift map,
wherein the automatic transmission control system is provided with a depressing force changing means configured to provide a changing point of a depressing force in a midway of depression stroke of the accelerator pedal, the shift map including a changing point of the engine rotating number located at a boundary where an operating amount of the throttle corresponds to the depressing force changing point by the accelerator pedal, and
wherein actuation of either the upshift or the downshift is controlled according to the shift map upon depression of the accelerator pedal beyond said depressing force changing point.

2. The automatic transmission control system according to claim 1, wherein the depressing force changing means comprises a reaction force generating mechanism that generates a reaction force against the depression of the accelerator pedal.

3. The automatic transmission control system according to claim 2, wherein the reaction force generating mechanism comprises a damper configured to provide a resistance force against the depression of the accelerator pedal.

4. The automatic transmission control system according to claim 1, wherein the automatic transmission means includes a plurality of shift maps defined by the throttle operating amount and the number of rotation of the engine, which are different from one another in accordance with a running state of a vehicle, and
wherein one of the plurality of shift maps is selected to switch to the selected one from another in accordance with a depressing degree beyond the depressing force changing point of the accelerator pedal.

5. The automatic transmission control system according to claim 4, wherein the shift maps comprise a normal running shift map of upshift or downshift for a flat road, an acceleration shift map for a flat road in which the engine rotating number for upshift or downshift is set higher than that of the normal running shift map for the flat road, and a hill climbing shift map in which the engine rotating number for the upshift or downshift is set higher than that of the acceleration shift map for the flat road.

* * * * *